Patented Mar. 12, 1929.

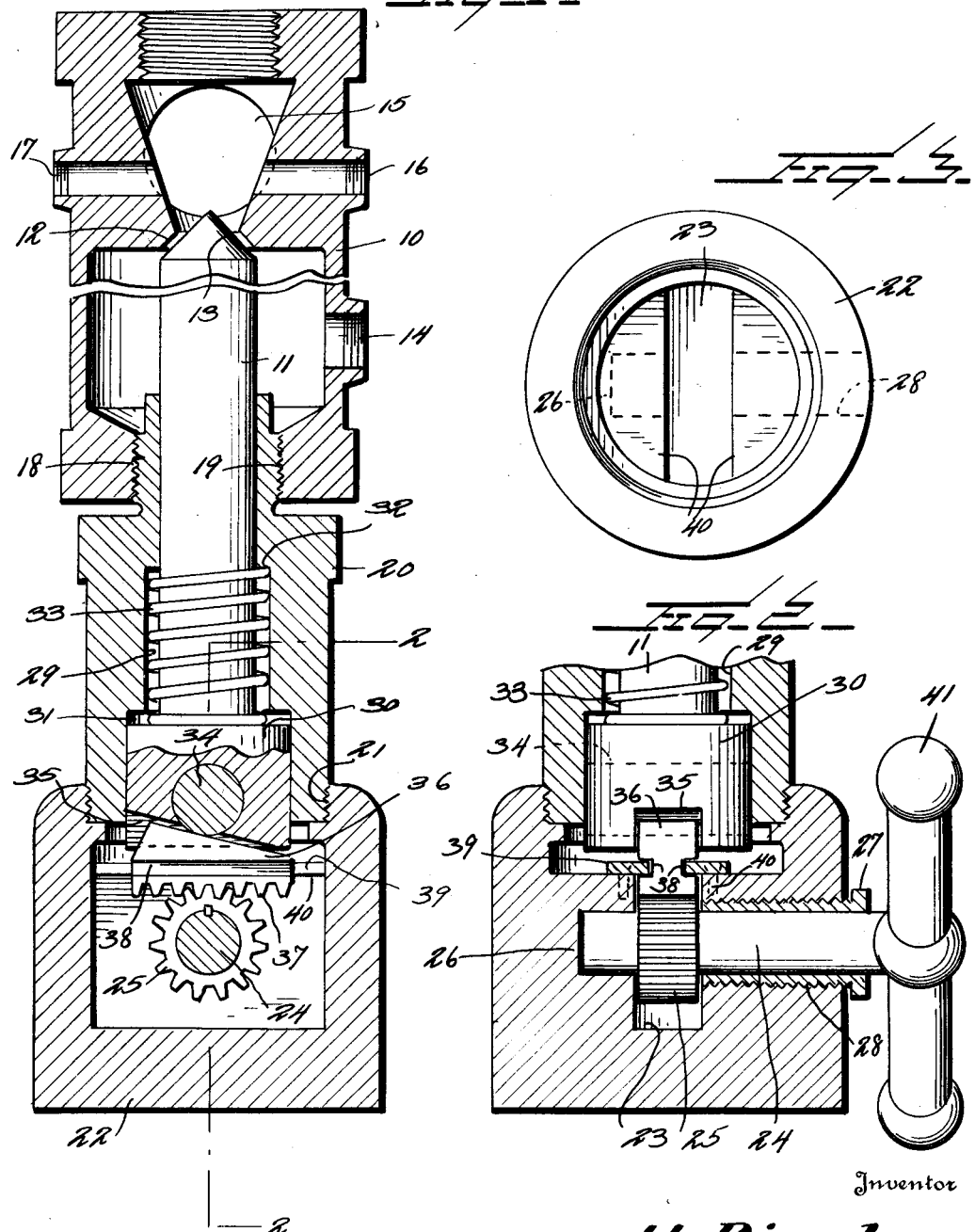

1,705,139

UNITED STATES PATENT OFFICE.

HERMAN EIGAL, OF CASPER, WYOMING.

QUICK-ACTION CONTROL VALVE.

Application filed April 10, 1928. Serial No. 268,854.

This invention relates to valves for controlling pressure, and particularly to valves used where a high pressure is desired on presses used for the putting on or taking off of railway truck wheels, engine wheels or anything requiring heavy pressure.

One of the general objects of the invention is to provide a valve of this character so constructed that it will not slip or drop while in action and will close or open with a relatively short turn and has a pressure holding capacity of some three hundred and fifty tons.

A further object is to provide a valve controlling means of this character which is relatively inexpensive, efficient and safe, and which can be operated from a distance as well as relatively near by.

Other objects will appear in the course of the following description.

My invention is illustrated in the accompanying drawing, wherein:—

Figure 1 is a vertical sectional view of a valve casing, the valve actuating mechanism therefor being shown in elevation;

Figure 2 is a section on the line 2—2 of Figure 1;

Figure 3 is a top plan view of the lower section of the valve casing;

Referring to this drawing, 10 designates the valve casing within which the valve 11 operates. This valve casing is formed with a seat 12 against which the tapered end 13 of the valve 11 seats, and to one side of this seat 12 the valve casing 10 is formed with the outlet port 14. On the other side of the seat 12 the valve casing is formed with an intake connection 15 and with screw-threaded ports 16 and 17 for the reception respectively of a pressure gauge and safety valve. None of the particular structure of the valve casing has anything to do with the present invention.

The outer end of the valve casing on the inside face is screwthreaded, as at 18, for the reception of a screw-thread 19 formed on a hollow casing member 20. This casing member at the ends opposite the screw-threads 19 is exteriorly screw-threaded, as at 21, for engagement with a head or casing member 22 formed to provide a relatively large chamber 23. Extending through this chamber is a shaft 24 carrying upon it the gear wheel 25 which is keyed upon the shaft. This shaft at one end has a bearing in a recess 26 in one wall of the head 22 and passes through an exteriorly screw-threaded bearing sleeve 27 which is screwed into a passage 28 formed in the side wall of the head 22 opposite the bearing recess 26. The casing member 20 fits the valve 11 for a portion of its length and then is enlarged at 29.

The inner end of the valve 11 is provided with a head 30, the member 20 being enlarged at 31 to accommodate this head, and disposed to surround the valve 11 and to bear at one end against the shoulder 32 and at the other end against this head 30 is a coiled compression spring 33 which urges the head toward the gear wheel 25. The head 30 is transversely bored for the reception of a cylindrical roller 34 and the head is transversely slotted, as at 35. Operating in this slot is a sliding wedge 36, the under face of which is provided with teeth 37 with which the teeth on the gear wheel 25 engage. This wedge is longitudinally recessed at 38 and guide strips 39 are attached to shoulders 40 on the head or casing section 22 and project into these slots 38.

It will be obvious now that as the gear wheel 25 is rotated in one direction it will shift the wedge toward the left in Figure 1 and when it is rotated in the other direction it will shift the wedge toward the right in Figure 1, and that when the wedge is shifted toward the right it will bear against the roller 34 and urge the valve outward, whereas when it is shifted toward the left in Figure 1 it will permit the spring 33 to retract the valve. The shaft 24 at its outer end is provided with a handle 41 whereby a powerful leverage may be applied to the gear wheel 25 to cause a shifting of the wedge 36.

It will be seen that this construction permits great power to be applied to the valve to shift it from its fully open to its fully closed position or through any portion of its travel, while at the same time the action is relatively quick.

It will also be seen that this construction provides means whereby a valve used for controlling a high air pressure may be operated without any chance of slipping or dropping while in action. One-quarter turn of the handles 41 will fully open or fully close the valve, and it has been demonstrated that it has an ability to hold against a pressure of some three hundred and fifty tons. Operating rods may be attached to the extremities of the handle for operating from a distance, if desired, in an obvious manner. The material used is preferably bronze and steel so that the valve and its casing is strong, durable, efficient and has a long life. It is so simple that there is practically nothing to get out of repair and will operate with either oil or water used as a pressure medium, which may be made of any size and applied in any situation where a press is needed and the pressure medium must be controlled by a valve.

While I have illustrated certain details of construction and arrangement of parts, I do not wish to be limited thereto as it is obvious that many minor changes might be made therein without departing from the spirit of the invention as defined in the appended claims.

I claim:—

1. The combination with a longitudinally shiftable valve, of controlling means therefor comprising a gear wheel disposed opposite one end of the valve, a wedge having teeth engaged by said gear wheel, the rotation of the gear wheel acting to shift the wedge laterally and the wedge operatively engaging the valve to shift it longitudinally, and a spring urging the valve against the wedge.

2. In valve mechanism of the character described, a longitudinally movable valve having a head at one end, a casing in which the valve operates, a spring bearing against the head and urging the valve in one direction, a casing forming part of the first named casing and enclosing the head end of the valve, a gear wheel mounted therein, a transversely shiftable wedge mounted in the second named casing beyond the end of the valve and engaged by said gear wheel, the valve having a roller bearing against the wedge, and means for rotating the gear wheel.

3. In a valve mechanism of the character described, a casing, a longitudinally movable valve therein having a head, a spring in the casing urging the bearing against the head and urging it inward, a casing enclosing the headed end of the valve, a shaft extending into said casing and having a gear wheel, a wedge mounted in guides in the second named casing for movement transversely of the longitudinal axis of the valve, the wedge having teeth engaged by said gear wheel, and a roller carried by the head and against which the wedge bears.

4. A valve structure of the character described comprising a casing, a cylindrical valve extending through the casing and longitudinally movable therein and having a head at its inner end, a spring bearing against said head, a casing section enclosing the headed end of the valve, a transverse shaft extending through the second named casing and having a gear wheel thereon, means exteriorly of the casing for rotating said shaft, a wedge having teeth engaging the gear wheel, guides for the wedge, the head being cut away to receive said wedge, and a roller disposed within the head and against which the wedge bears.

5. In a valve structure of the character described, a casing having a valve seat, a longitudinally extending valve tapered to engage said seat, a casing section forming an extension of the first named casing and into which said valve stem extends, the valve stem carrying a head and the second named casing section being enlarged to receive the head, a spring bearing against the head and urging the valve to a retracted position away from the seat, a roller carried by the head of the valve, a transversely shiftable wedge engaging against the roller and having gear teeth on one face, and a rotatable shaft carrying a gear wheel and extending transversely to the movement of the wedge, the gear wheel engaging said teeth whereby as the shaft is rotated the wedge may be shifted in one direction or the other to thereby shift the valve.

In testimony whereof I hereunto affix my signature.

HERMAN RIGAL.